(12) United States Patent
Hirth et al.

(10) Patent No.: US 7,974,318 B2
(45) Date of Patent: Jul. 5, 2011

(54) INFRA-RED MULTI-WAVELENGTH LASER SOURCE

(75) Inventors: Antoine Hirth, Niffer (FR); Christelle Kieleck, Saint Louis (FR)

(73) Assignee: Institut Franco-Allemand de Recherches de Saint-Louis, Saint-Loius (FR)

( * ) Notice: Subject to any disclaimer, the term of this patent is extended or adjusted under 35 U.S.C. 154(b) by 0 days.

(21) Appl. No.: 11/482,049

(22) Filed: Jul. 7, 2006

(65) Prior Publication Data

US 2007/0019688 A1    Jan. 25, 2007

(30) Foreign Application Priority Data

Jul. 7, 2005   (FR) ...................................... 05 07239

(51) Int. Cl.
*H01S 3/30* (2006.01)
(52) U.S. Cl. .................... 372/6; 372/3; 372/21; 372/69; 372/70
(58) Field of Classification Search .................. 372/3, 6, 372/21, 70
See application file for complete search history.

(56) References Cited

U.S. PATENT DOCUMENTS

| | | | | |
|---|---|---|---|---|
| 4,213,060 A | * | 7/1980 | Byer et al. ...................... | 359/327 |
| 5,105,428 A | * | 4/1992 | Pocholle et al. ................ | 372/24 |
| 5,163,061 A | * | 11/1992 | Moberg .................... | 372/29.022 |
| 5,265,106 A | * | 11/1993 | Garcia et al. ...................... | 372/3 |
| 5,400,173 A | | 3/1995 | Komine | |
| 5,566,195 A | | 10/1996 | Heppner et al. | |
| 6,496,634 B1 | | 12/2002 | Levenson | |
| 2004/0052278 A1 | * | 3/2004 | Kane et al. ...................... | 372/25 |
| 2004/0263843 A1 | * | 12/2004 | Knopp et al. .................. | 356/301 |
| 2006/0050749 A1 | * | 3/2006 | Setzler ............................ | 372/22 |
| 2006/0268950 A1 | * | 11/2006 | Kane ............................... | 372/30 |

FOREIGN PATENT DOCUMENTS

FR          2 798 779 A1     3/2001

OTHER PUBLICATIONS

F. Biancalana, et a. "Resonant and off-resonant two color Raman solutions in gas filled photonic band-gap fibers" Phys. Rev. Lett. 93, 143907 (2004), p. 1463.*
Lefebvre M. et al., "Raman Injected Optical Parametric Oscillator", Optics Communications, North-Holland Publishing Co., Amsterdam, NL, vol. 139, No. 4-6, Jul. 1, 1997, pp. 241-246, XP004082573, ISSN: 0030-4018, p. 243, paragraph 3; figure 1.

(Continued)

*Primary Examiner* — Jessica T Stultz
*Assistant Examiner* — Delma R Fordé
(74) *Attorney, Agent, or Firm* — Oliff & Berridge, PLC

(57) ABSTRACT

The present invention relates in particular to the field of lasers and in particular to a laser source having a neodymium-doped crystal (2; 23) or fiber and pumpable by pumping means (3; 25) and a non-linear Raman effect converter stimulated in methane (4; 32), characterized in that the crystal (2; 23) or fiber pumped by said pumping means (3; 25) is able to emit a laser radiation at a wavelength between 1.31 and 1.36 μm and in that the Raman converter (4; 32) is able to convert the radiation generated by the crystal (2; 23) or by the fiber into at least one second radiation (7; 36) with a wavelength between 2 and 2.3 μm.

11 Claims, 1 Drawing Sheet

OTHER PUBLICATIONS

Roy G. et al., "Comparison of Raman and Degenerated Optical Parametric Oscillators for a High-Energy and High-Repetition-Rate Eye-Safe Laser", Optical Engineering, Soc. of Photo-Optical Instrumentation Engineers, Belling ham, US, vol. 35, No. 12, Dec. 1, 1996, pp. 3579-3584, XP000678986, ISSN: 0091-3286, Figures 1, 2.

Hanna D. C. et al., "A Synchronously Pumped Waveguide $CH_4$ Raman Laser at 1.54 μm", Optics Communications Netherlands, vol. 65, No. 4, Feb. 15, 1988, pp. 279-282, XP002377280, ISSN: 0030-4018 The entire document.

* cited by examiner

INFRA-RED MULTI-WAVELENGTH LASER SOURCE

INCORPORATION BY REFERENCE

The disclosure of French Patent Application No. 05 07239 filed on Jul. 7, 2005, including the specification, drawings and abstract, is incorporated herein by reference in its entirety.

BACKGROUND

The invention relates to lasers, in particular, a laser source able to emit several different wavelengths in the infrared. Laser sources that are able to emit several wavelengths in the various atmospheric transmission bands are needed for numerous applications, such as LIDARs, detecting atmospheric pollutants, or optronic countermeasures.

The common element for this type of laser developed today is a solid fixed or tunable wavelength source associated with nonlinear optical components, such as an optical parametric oscillator (OPO) or Raman converter.

The problems encountered in developing these lasers relate to the spatial quality of the beams obtained, the average pulsed energy or power performances, and the total efficiency expressed as usable laser power generated in the spectral bands to be covered relative to the electric power injected into the pumping diodes. Very often, at the output of an OPO converter, one of the two wavelengths generated (signal or idler) is outside the spectral range investigated. Thus, when the wavelength does not exceed 2 µm, an OPO designed to cover the II band, namely 3 to 5 µm, cannot emit in the upper part at about 5 µm and in the bottom part at the same time. When, for optronic countermeasure applications, the goal is to cover the I band (about 2.1-2.2 µm) and the II band (about 4.1/4.2 and 4.6/4.7 µm) with a pumping laser followed by an OPO, the pumping wavelength must be above 2 µm. Today, for these applications, two diode-pumped solid source designs are preferred.

A source based on a neodymium laser emitting at about 1 µm, and associated with 2 OPOs in a cascade, is needed to reach the II band. For example, Nd:YVO$_4$ emitting at 1.06 µm at a repetition rate of 5 kHz followed by a first OPO (PPNL, PPKTP, KTP, KTA, etc.) that supplies two waves at 2.18 µm and 2.06 is needed. $\lambda 1$=2.06 µm can be considered as being in the I band. The wave at 2.18 µm pumps a second OPO (ZGP for example) so that two wavelengths can be obtained, namely 4.1 and 4.6 µm in the II band. The theoretical efficiency is 18% at the output of the first OPO for $\lambda$=2.18 µm assuming that the efficiencies are near-identical for the signal and the idler. By comparison to the pump beam at 1.06 µm, the beam at 2.18 µm has a spatial profile of distinctly inferior quality. At the output from the second OPO for the two II band wavelengths, $\lambda_2$ at 4.1/4.2 µm and $\lambda_3$ at 4.6/4.7 µm, the total efficiency is less than 9% and the profiles of the emitted beams have deteriorated still further.

Another at least equally advantageous solution is based on a Tm—Ho source emitting at 2.09 µm associated with a single OPO to emit in the II band. At 2.09 µm, the beam quality is excellent ($M^2$<1.2) and the efficiency is over 20%. However, in a ZGP OPO emitting at 3.83 and 4.6 µm, one of the two wavelengths, $\lambda 2$=3.83 µm, is not ideally placed for optronic countermeasure applications. Moreover, the ZGP crystal has, at 2.09 µm, depending on the quality, an absorption coefficient of between 0.03 and 0.1/cm. This Tm:YLF→Ho:YAG source design as the pumping source for an OPO has two other drawbacks.

The Ho:YAG pumping wave supplied by Tm:YLF at 1.91 µm is close to a water vapor absorption line, which leads to intensity fluctuations. For a military application, the Tm:YLF source must be placed in a dry-air enclosure. Replacement of Tm:YLF by a thulium doped silica fiber laser makes the assembly more stable, but has a lower efficiency because the pumping efficiency of thulium at $\lambda$=0.793 µm is not the same in silica as in a YLF crystal. Moreover, the length of the Ho:YAG crystal laser pulses in the Q-switched mode varies considerably with the repetition rate. The length increases from 30 ns to 120 ns for a rate increasing from 10 kHz to 50 kHz. Thus, the OPO, placed behind the Ho:YAG pulsed source, has a behavior that varies considerably with the repetition rate. In the Tm:YLF→Ho:YAG source, the Tm:YLF crystal remains fairly fragile despite the use of composite crystals that allow the fracture limit to be pushed back to 15 kW/cm$^2$.

SUMMARY

For generating a laser radiation in the infrared, U.S. Pat. No. 4,213,060 describes a source having a neodymium laser able to generate a first radiation at the 1.06 µm wavelength, this first radiation being introduced into a tunable optical parametric oscillator that is able to convert the first radiation into a second radiation with a wavelength of 1.4 to 4 µm. This second radiation being introduced into a Raman converter with gas, for example methane, that is able to convert it into a third radiation whose frequency depends on that of the second radiation. Such a source has drawbacks. Several radiations are obtained at different wavelengths and obtaining other wavelengths requires the OPO to be tuned. Hence the system needs to be adjusted, in particular, by changing the position of the OPO crystal which is necessary for obtaining all the desired wavelengths in the context of the invention, namely about 2.1-2.2 µm in the I band and about 4.1-4.2 and 4.6-4.7 µm in the II band.

For generating a laser radiation in the infrared whose wavelength is between 2 and 5 µm, U.S. Pat. No. 5,400,173 describes a source having a neodymium laser able to generate a first radiation with a wavelength of 1.06 µm. This first radiation is introduced into a first tunable optical parametric oscillator that is able to convert the first radiation into a second radiation and a third radiation with respectively wavelengths of 1.5-1.6 µm and 3.1-3.6 µm, with these radiations being injected into a second tunable OPO from which the third, fourth, and fifth radiations emerge with wavelengths of between 2.1 and 3 µm and 3.2 and 4.9 µm, respectively.

FIG. 2 shows that such a device is not able to simultaneously produce the wavelengths desired in the context of the invention, namely about 2.1-2.2 µm in the I band and about 4.1-4.2 and 4.6-4.7 µm in the II band.

The present invention thus remedies these drawbacks, plus achieves various other advantages, by proposing a laser source that is able to emit at least one laser radiation at different wavelengths of about 2.1-2.2 µm in the I band and preferably also in the II band at about 4.1-4.2 and 4.6-4.7 µm simultaneously or not, allowing generation of a pulsed high-rate or low-rate radiation with a high energy per pulse that can reach about one hundred kHz with a very low variation in pulse length and having high efficiency.

The solution provided is a laser source having a neodymium-doped crystal or fiber pumpable by a pumping device, and a non-linear Raman effect converter stimulated in methane, wherein the crystal or fiber pumped by the pumping device is able to emit a laser radiation at a wavelength between 1.31 and 1.36 µm, and the Raman effect converter is able to convert the radiation generated by the crystal or fiber into at least one second radiation with a wavelength between 2 and 2.3 μm.

According to one particular feature, the pumping device is able to achieve emission of the neodymium-doped crystal at its $^4F_{3/2} \rightarrow {}^4I_{13/2}$ transition.

According to another feature, the neodymium-doped crystal is chosen from the following crystals: YAG, YALO, YVO$_4$, or KGW.

According to another feature, the pumping device comprises a solid laser, for example at least one laser diode.

According to another particular feature, the Raman effect converter is comprised of a hollow fiber containing methane under pressure.

According to another feature, the hollow fiber is of the photonic crystal guided type.

According to an additional feature, a laser source according to the invention additionally has an optical parametric oscillator that can be pumped by the second radiation coming from the Raman effect converter.

According to another feature, the optical parametric oscillator is comprised of a laser cavity using a crystal, such as for example ZnGeP$_2$ (ZGP) or CdSe, or quasi-phase-matched semiconductors such as GaAs or ZnSe.

According to one particular feature, the optical parametric oscillator is able to emit two radiations whose wavelengths are between 3.8 and 5 μm.

According to one particular feature, the optical parametric oscillator is able to generate a first radiation with a wavelength between 4.1 and 4.2 μm and a second radiation with a wavelength between 4.6 and 4.7 μm.

BRIEF DESCRIPTION OF THE DRAWINGS

Other advantages and features of the present invention will appear from the description of a number of alternative embodiments of the invention with reference to the attached drawings wherein.

DETAILED DESCRIPTION OF PREFERRED EMBODIMENTS

Figure 1:
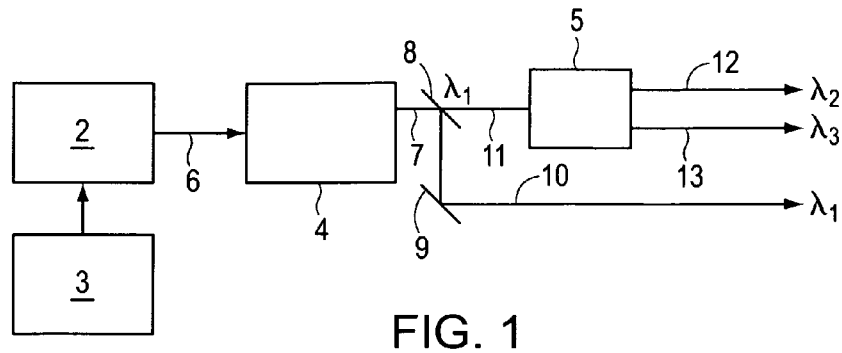
FIG. 1 shows the general means of which the invention is composed.

FIG. 1 is a general schematic drawing of a laser source according to the invention.

This laser source 2 has a neodymium-doped crystal pumpable by a pumping device 3, a non-linear Raman effect converter 4 stimulated in methane, and an optical parametric oscillator 5.

The pumping device 3 is able to cause the neodymium-doped crystal to emit at its $^4F_{3/2} \rightarrow {}^4I_{13/2}$ transition such that the latter crystal emits a laser radiation 6 at a wavelength λp between 1.31 and 1.36 μm depending on the nature of the crystal.

The non-linear Raman effect converter 4 stimulated in methane is of the known type and is comprised of a hollow fiber which, in its hollow part, contains methane under pressure.

The laser radiation emitted by the neodymium-doped crystal is guided inside the hollow fiber and reacts with the methane to generate a radiation 7 with a wavelength λ1 between 2.1 and 2.3 μm as a function of the input wavelength λp of the radiation and hence, as mentioned above, of the nature of the neodymium-doped crystal.

Means 8, 9 for dividing the radiation 7 coming from Raman effect converter 4 are disposed between this converter 4 and the optical parametric oscillator 5. These dividing means 8,9 are able to divide the radiation 7 coming from the Raman effect converter 4 into a first radiation 10 able to be emitted directly by the laser source and a second radiation 11 able to supply the optical parametric oscillator 5.

The optical parametric oscillator 5 is classical and corresponds to the prior art. It uses a singly resonant cavity with a single pump passage and employs classical ZnGeP$_2$ crystals allowing phase matching for λp=2.2 μm.

The radiation 11, supplying the optical parametric oscillator 5 with wavelength λ1, is converted, in the latter, into two radiations 12 and 13 with respective wavelengths λ2 and λ3 between 3 and 5 μm.

The table below presents the approximately values of the wavelengths λp, λ1, λ2, and λ3 for various Nd:X crystals, namely the following crystals: yttrium aluminum garnet (YAG), yttrium vanadate (YVO$_4$), yttrium aluminate (YALO), and potassium gadolinium tungstate (KGW).

| Nd:X | λ (μm) | λ1 (μm) | λ2/λ3 (μm) |
|---|---|---|---|
| Nd:YAG | 1.321 | 2.148 | 3.76/5 |
| Nd:YALO | 1.341 | 2.201 | 4.06/4.8 |
| Nd:YVO$_4$ | 1.3425 | 2.205 | 4.1/4.8 |
| Nd:KGW | 1.351 | 2.228 | 4.018/5 |

Figure 2:
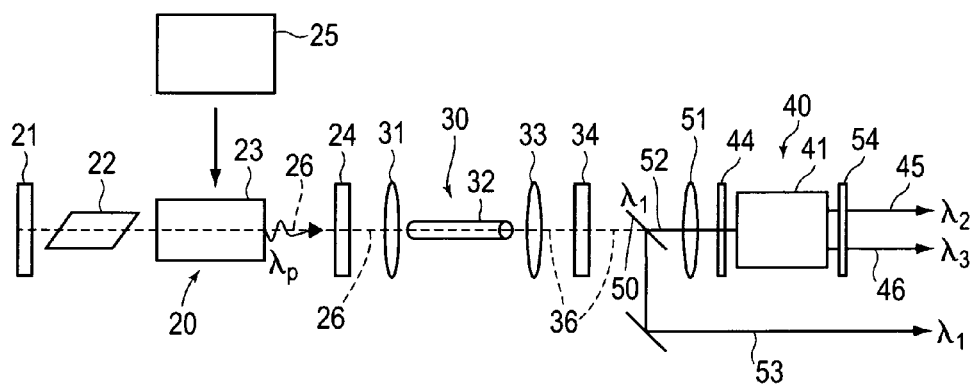
FIG. 2 shows a first embodiment of the invention.

FIG. 2 shows one particular embodiment of a laser source according to the invention. This source has three cavities 20, 30, and 40.

The first cavity 20 has a first mirror 21, an acousto-optic modulator or an electro-optic Q-switch 22, a crystal 23, and a second mirror 34. A pumping device 25 for pumping the crystal 23 is associated with this cavity and, more particularly, with the crystal 23. The cavity 20 is thus delimited by the two mirrors 21 and 34.

The acousto-optic modulator 22 is of the known type. Its function is to allow discontinuous operation of the laser source and to adjust its operating frequency according to the desired application. Thus, for example, it enables operation at a high repetition rate, particularly up to over 100 kHz, when the crystal is made of neodymium-doped yttrium vanadate (Nd:YVO$_4$).

The crystal 23 is made of neodymium-doped yttrium vanadate while the pumping device 25 has diodes and means for supplying these diodes. The diodes are able to emit at a wavelength of 0.808 μm to achieve emission of the neodymium-doped crystal at its $^4F_{3/2} \rightarrow {}^4I_{13/2}$ transition such that, when pumped in this way, it emits a laser radiation 26 at a wavelength λp of 1.3425 μm. The mirrors 21 and 34 are highly reflecting at the emission wavelength λp of 1.3425 μm of the crystal 23 to allow the Raman converter to pump at the maximum power available in cavity 20.

The second cavity 30 has a mirror 24 with a maximum transmission at a wavelength λp of 1.3425 μm and a maximum reflection at the wavelength λ1 of about 2.1 and 2.2 μm. It also has a first collimation lens 31, a non-linear Raman effect converter 32 stimulated in methane (CH$_4$, $\bar{V}_R$=2914 cm$^{-1}$), a second collimation lens 33 and the mirror 34 common to cavity 20 and having a maximum reflection at the wavelength λp of 1.3425 μm and an optimized transmission at wavelengths λ1 at about 2.1 and 2.2 μm to obtain the best Raman converter efficiency.

This Raman effect converter 32 is comprised of a hollow fiber guided by photonic band gap crystals with low losses at 1.34 μm and 2.2 μm and having a window at each of its ends. To obtain a satisfactory conversion efficiency of 1.3 at about 2.1/2.2 μm, the methane is used at a pressure of several tens of atmospheres and the pump power density reaches several 100 MW/cm$^2$ at 1 GW/cm$^2$ [1]. The core of the hollow fiber has a diameter of approximately 20 to 50 μm while its length is a few tens of cm. The theoretical efficiency at the output of the Raman converter is approximately 45% and, in practice, an efficiency of at least 15% is obtained (diode 0.808 µm→2.2 µm).

The second mirror 24 is highly reflective at the emission wavelength of the Raman effect converter 32 while the mirror 34 has optimized transmission for wavelengths of about 2.1/2.2 µm.

Thus, the Raman effect converter 32 is pumped by the laser radiation 26 and emits a radiation 36 at the first methane Stokes line at a wavelength λ1 that is between 2.1 and 2.2 µm.

The third cavity 40 is comprised of a classical optical parametric oscillator 41 using a singly resonant cavity between mirrors 44 and 54, single pump passage. In this case, the radiation 36 has a wavelength λp=2.2 µm, employing classical $ZnGeP_2$ crystals allowing phase matching for λp=2.2 µm. This optical parametric oscillator 41 is able to emit two radiations 45 and 46, namely the signal and its idler, one at a wavelength λ2 of approximately 4.1/4.2 µm and the other at a wavelength λ3 of approximately 4.6/4.7 µm.

In addition, means 50 for dividing the radiation 36 coming from Raman effect converter 32 are disposed between the second cavity 30 and the third cavity 40. A part 52 of this radiation is directed toward the optical parametric oscillator 41 via focusing means 51, in this case a focusing lens, while a second part 53 can be emitted by the laser source.

The operation of the laser source is as follows:

When the laser diodes are supplied with current, they emit, in the direction of crystal 23, a continuous radiation at a wavelength of 0.808 µm giving rise to a corresponding emission at the $^4F_{3/2} \rightarrow ^4I_{13/2}$ transition of the neodymium. Since the acousto-optical modulator 22 is adjusted to a certain operating frequency of the source, for example 100 kHz, crystal 23 begins to lase at this frequency thus generating a pulsed radiation 26 at a wavelength of 1.3425 µm. This pulsed radiation 26 leaves the first cavity and penetrates into second cavity 30 then into Raman converter 32 which can modify its wavelength. The Raman converter 32 is pumped by the pulsed laser radiation 26 and emits a radiation 36 at the first methane Stokes line at a wavelength λ1 that is between 2.1 and 2.2 µm.

Part of this pulsed radiation 36 is picked up by means 50 dividing the radiation 36 coming from Raman converter 32 and can thus be emitted by the source while the other part of this radiation 36 passes through the focusing lens 51 that creates a focal spot a few hundred µm in diameter; the interaction length (Rayleigh length) can be a few millimeters or centimeters, depending on the focal length of the lens, the $M^2$, and the pump beam diameter. The radiation leaving the focusing lens penetrates into the third cavity 40, in this case the optical parametric oscillator 41 from which emerge two synchronized pulsed radiations, namely signal 45 and its idler 46, one at a wavelength λ2 of approximately 4.1/4.2 µm and the other at a wavelength λ3 of approximately 4.6/4.7 µm, these two radiations 45 and 56 being emittable by the laser source.

The use of an $Nd:YVO_4$ crystal allows operation at a high repetition rate (over 100 kHz) and allows pulsed energies of 0.1 to 0.5 mJ or even more to be supplied.

Figure 3:
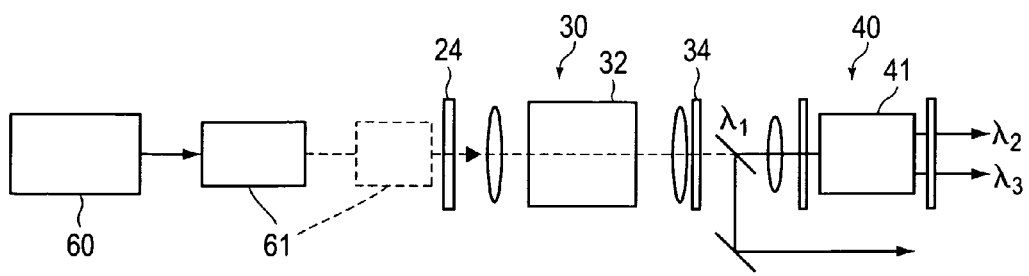
FIG. 3 shows a second embodiment of the invention.

FIG. 3 is a schematic diagram of a second embodiment of the invention in which, relative to the embodiment described above, the first cavity is replaced by a master laser oscillator power amplifier (MOPA) which has an oscillator 60 using an neodymium-doped yttrium aluminate crystal (Nd:YALO) and a system 61 amplifying the radiation coming from oscillator 60. With such a laser source, it is possible to operate at a limited rate of a few tens of Hz with an energy of over 100 mJ per pulse and per wave generated at the optical parametric oscillator output. The use of an Nd:YAG crystal (λp=1.321 µm) also enables high operating rates to be achieved.

Of course, numerous modifications can be made to the embodiments described above without departing from the framework of the invention.

Thus, other neodymium-doped crystals than those referred to in the application can be used in the framework of the invention. Also, the optical parametric oscillator (OPO) using $ZnGeP_2$ (ZGP) crystals can be replaced by an OPO using CdSe crystals or quasi-phase-matched semiconductors such as GaAs or ZnSe. In place of neodymium-doped sources using crystals and emitting at about 1.32/1.34 µm, one can also use doped fiber sources. Thus, a neodymium-doped fluoride glass laser could be used.

The invention claimed is:

1. A method of producing a laser beam, the method comprising:
   generating a first laser radiation at a wavelength between 1.31 and 1.36 µm from a laser source having a neodymium-doped crystal pumping device;
   converting the first laser radiation in a Raman shift stimulated in methane to generate a second laser radiation with a wavelength between 2 and 2.3 µm; and
   introducing only the second laser radiation into an optical parametric oscillator to generate a third radiation between 3.76 and 5 µM.

2. The method according to claim 1, wherein the Raman shift converts the first laser radiation to a wavelength between 2.14 and 2.23 µM.

3. The method according to claim 2, wherein the neodymium-doped crystal is chosen from the following crystals: Nd:YAG, Nd:YALO, $Nd:YVO_4$, or Nd:KGW.

4. The method according to claim 1, wherein the Raman shift is comprised of a hollow fiber containing methane under pressure.

5. The method according to claim 4, wherein the hollow fiber is photonic crystal guided.

6. A laser source having a neodymium-doped crystal or fiber pumpable by a pumping device, and a non-linear Raman effect converter stimulated in methane, wherein:
   the crystal or fiber pumped by the pumping device is able to emit a first laser radiation at a wavelength between 1.31 and 1.36 µm,
   the Raman effect converter is a Raman shift,
   only the first laser radiation enters into the Raman shift,
   the Raman shift is able to directly convert the first laser radiation generated by the crystal or fiber into at least one second radiation with a wavelength between 2 and 2.3 µm, and
   an optical parametric oscillator pumped only by the second radiation coming from the Raman shift to obtain an output radiation wavelength between 3.76 and 5 µm.

7. The laser source according to claim 6, wherein the optical parametric oscillator is comprised of a laser cavity using a crystal or quasi-phase-matched semiconductors.

8. The laser source according to claim 6, wherein the optical parametric oscillator is able to emit two radiations whose wavelength is between 3.8 and 5 µm.

9. The laser source according to claim 6, wherein the crystal is made of neodymium-doped yttrium vanadate and in that the optical parametric oscillator is able to generate a first radiation with a wavelength between 4.1 and 4.2 µm and a second radiation with a wavelength between 4.6 and 4.7 µm.

10. The laser source according to claim 7, wherein the crystal is $ZnGeP_2$ (ZGP) or CdSe.

11. The laser source according to claim 7, wherein the quasi-phase-matched semiconductors is GaAs or ZnSe.

* * * * *